(12) United States Patent
Lupon et al.

(10) Patent No.: US 9,389,871 B2
(45) Date of Patent: Jul. 12, 2016

(54) COMBINED FLOATING POINT MULTIPLIER ADDER WITH INTERMEDIATE ROUNDING LOGIC

(71) Applicant: Intel Corporation, Santa Clara, CA (US)

(72) Inventors: Marc Lupon, Barcelona (ES);
Grigorios Magklis, Barcelona (ES);
Sridhar Samudrala, Austin, TX (US);
Raul Martinez, Barcelona (ES);
Kyriakos A. Stavrou, Barcelona (ES);
Enric Gibert Codina, Sant Cugat del Valles (ES)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 13/840,363

(22) Filed: Mar. 15, 2013

(65) Prior Publication Data

US 2014/0281419 A1    Sep. 18, 2014

(51) Int. Cl.
*G06F 9/30* (2006.01)
*G06F 9/38* (2006.01)
*G06F 9/455* (2006.01)

(52) U.S. Cl.
CPC ............ *G06F 9/3861* (2013.01); *G06F 9/3001* (2013.01); *G06F 9/3017* (2013.01); *G06F 9/45508* (2013.01)

(58) Field of Classification Search
None
See application file for complete search history.

(56) References Cited

U.S. PATENT DOCUMENTS

| | | |
|---|---|---|
| 7,434,073 B2 | 10/2008 | Magklis et al. |
| 7,665,000 B2 | 2/2010 | Gonzalez et al. |
| 7,698,512 B2 | 4/2010 | Magklis et al. |
| 7,814,339 B2 | 10/2010 | Monferrer et al. |
| 7,895,415 B2 | 2/2011 | Gonzalez et al. |
| 7,930,574 B2 | 4/2011 | Cai et al. |
| 8,166,323 B2 | 4/2012 | Cai et al. |
| 8,190,652 B2 | 5/2012 | Latorre et al. |
| 8,261,046 B2 | 9/2012 | Gibert et al. |
| 2004/0122886 A1 | 6/2004 | Gerwig et al. |
| 2005/0144214 A1 | 6/2005 | Datta et al. |
| 2006/0136540 A1 | 6/2006 | Tang et al. |
| 2006/0184601 A1 | 8/2006 | Trong et al. |
| 2007/0061392 A1 | 3/2007 | Gerwig et al. |
| 2007/0083583 A1 | 4/2007 | Gerwig et al. |
| 2008/0256150 A1 | 10/2008 | Quinnell et al. |
| 2008/0256161 A1 | 10/2008 | Quinnell et al. |
| 2008/0256162 A1 | 10/2008 | Henry et al. |
| 2009/0150654 A1 | 6/2009 | Oberman et al. |
| 2009/0248779 A1 | 10/2009 | Brooks et al. |
| 2010/0121898 A1 | 5/2010 | Swartzlander, Jr. et al. |
| 2011/0040815 A1 | 2/2011 | Penton et al. |
| 2011/0072066 A1 | 3/2011 | Lutz |
| 2011/0231460 A1 | 9/2011 | Ahmed |
| 2012/0011181 A1 | 1/2012 | Samy et al. |
| 2012/0011187 A1 | 1/2012 | Mohamed et al. |

(Continued)

*Primary Examiner* — Scott Sun
(74) *Attorney, Agent, or Firm* — Trop, Pruner & Hu, P.C.

(57) ABSTRACT

An error handling method includes identifying a code region eligible for cumulative multiply add (CMA) optimization and translating code region instructions into interpreter code instructions, which may include translating sequences of multiply add instructions in the code region instructions into fusion code including CMA instructions. Floating point (FP) exceptions generated by the fusion code may be monitored and at least a portion of the code region instructions may be re-translated to eliminate some or all fusion code if CMA intermediate rounding exceptions exceed a threshold.

30 Claims, 9 Drawing Sheets

(56) References Cited

U.S. PATENT DOCUMENTS

| | | |
|---|---|---|
| 2012/0041997 A1 | 2/2012 | Inaganti et al. |
| 2012/0124117 A1 | 5/2012 | Yu et al. |
| 2012/0221614 A1 | 8/2012 | Brooks et al. |
| 2013/0007075 A1 | 1/2013 | Oliver et al. |
| 2013/0268794 A1* | 10/2013 | Hancock ............. G06F 9/30014 713/323 |
| 2013/0332501 A1 | 12/2013 | Boersma et al. |
| 2014/0067894 A1* | 3/2014 | Plondke ................. G06F 7/535 708/501 |

* cited by examiner

COMBINED FLOATING POINT MULTIPLIER ADDER WITH INTERMEDIATE ROUNDING LOGIC

TECHNICAL FIELD

Embodiments described herein generally relate to processor architecture, and in particular, arithmetic logic units (ALUs) for complex floating point (FP) operations.

BACKGROUND

Multiply add sequences, in which the product of two operands is added to a third operand, i.e., (A*B+C), occur frequently in FP intensive applications. An FP multiply add sequence can be executed as a 2-input or simple FP multiplication to generate A*B followed by a simple FP addition to sum A*B and C. A reduction in the total number of clock cycles required to produce the result can be achieved with a 3-input FP ALU that includes an FP multiplier receiving the first two inputs and an FP adder receiving the third input and the output of the FP multiplier. Although the two approaches should yield the same result, discrepancies may arise because the output of the 2-input FP multiplier used in the simple or 2-cycle multiply add sequence is rounded under long standing floating point protocols.

DESCRIPTION OF EMBODIMENTS

Figure 1:
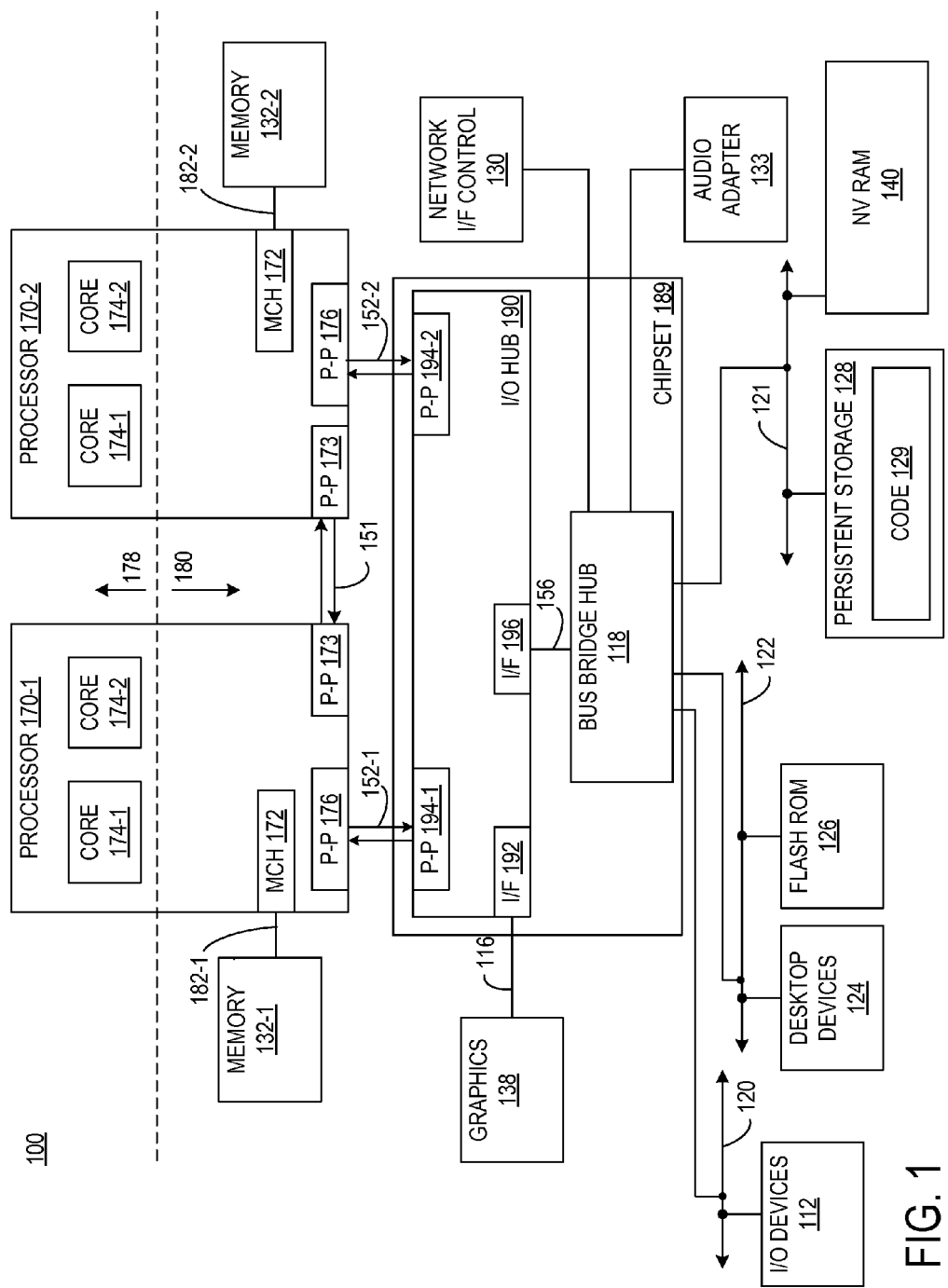
FIG. 1 illustrates a computer system used in conjunction with at least one embodiment.

Embodiments pertain to FP ALUs that include fused multiply add (FMA) units. FMA units perform multiply add operation in one sequence, with a single rounding event at the end of the operation, to calculate A*B+C. In at least one embodiment, a cumulative multiply add (CMA) instruction exercises an FMA ALU and introduces rounding logic at the result of the FMA multiplier to handle cases in which the use of an FMA ALU to optimize the execution of code that includes one or more 2-cycle multiply add sequences may not be efficient. The use of an FMA ALU to execute 2-cycle multiply add sequences is referred to herein as macro fusion.

In various embodiments, CMA macro fusion may be performed either by a static compiler, a just-in-time (JIT) compiler, a hardware unit in the core front-end to dynamically fuse sequences of FP multiplications and additions, or a binary optimizer. In at least one embodiment, a CMA instruction generates an FP exception when the correct value, i.e., the value that a 2-cycle multiply add sequence would produce, is not obtained due to a rounding fault. In some embodiments, when the CMA FP rounding imprecisions occur frequently, a performance barrier arises.

In at least one embodiment, CMA macro fusion is performed through a macro fusion optimization pass implemented by a binary optimizer. The binary optimizer may identify frequently executed hot regions, profile count execution frequencies, form large translation blocks, and optimize scheduled instructions placed inside the translated blocks. In some embodiments, a binary optimizer operates in a hot region basis, meaning that it applies transformations, manipulations and optimizations in the code placed inside a hot region, creating "optimized regions". In some embodiments, in order to minimize the hardware, additional rounding logic is limited to the most common situations, triggering a microcode routine or a CMA intermediate rounding exception when the result cannot be generated correctly. The problem arises when CMA intermediate rounding exceptions occur frequently.

The reactive mechanism of handling exceptions through macro fusion may be equally as effective on other ALU computations, such as combined multiply-then-store (CMULST), combined multiply-then-conversion to integer (CMULCVT) or combined multiply-then-subtract (CMULSUB). Similar situations where errors are produced by the rounding unit after the multiplication hardware may be handled with the disclosed method.

In at least one embodiment, a disclosed method of error handling includes identifying a code region eligible for CMA optimization and translating code region instructions into interpreter code instructions. In some embodiments, translating code region instructions into interpreter code instructions includes translating sequences of multiply add instructions in the code region instructions into fusion code including CMA instructions. In at least one embodiment, the interpreter code instructions are executed. The fusion code may be executed in some embodiments. In some embodiments, FP exceptions generated by the fusion code are monitored and at least a portion of the code region instructions is translated to eliminate the fusion code from the portion of the code region responsive to receiving a number of CMA intermediate rounding exceptions exceeding a predetermined threshold. In at least one embodiment, the monitoring of FP exceptions generated by the fusion code includes determining, responsive to receiving the FP exception, if the FP exception is one of the CMA intermediate rounding exceptions. In some embodiments, if the FP exception is one of the CMA intermediate rounding exceptions, a determination is made if a CMA intermediate rounding exception corresponding to the FP exception is a first fault. In at least one embodiment, if the CMA intermediate rounding exception corresponding to the FP exception is a first fault, a CMA region counter is initialized and if the CMA intermediate rounding exception corresponding to the FP exception is not a first fault, the CMA region counter is incremented and a determination is made if the CMA region counter has exceeded a predetermined threshold.

In at least one embodiment, if the FP exception is not one of the CMA intermediate rounding exceptions, an FP exception treatment is performed. In some embodiments, multiple code regions eligible for CMA optimization are identified, interpreter code corresponding to each of the code regions is generated, each of the code regions is assigned its own CMA region counter, and individual code regions are translated without fusion code based on their corresponding CMA region counter. The CMA region counter is periodically reset in some embodiments. In at least one embodiment, executing the interpreter code instructions includes executing a floating point multiply add sequence in a fused multiply add pipeline. In some embodiments, the fused multiply add pipeline includes CMA rounding logic at an output of a CMA multiplier. If the FP exception is one of the CMA intermediate rounding exceptions, in some embodiments, a faulting CMA instruction ID is obtained, a CMA instruction counter is associated with the CMA instruction ID, and the CMA intermediate rounding exceptions associated with the CMA instruction ID are counted. In at least one embodiment, if the CMA instruction counter has exceeded a predetermined threshold, individual code regions are retranslated with selective fusion code and the fusion code for a particular CMA instruction that caused the exception is disabled. In at least one embodiment, the CMA instruction counter is periodically reset. In some embodiments, a CMA rounding error is reported to a CMA intermediate rounding exception IP register. The CMA intermediate rounding exception IP register is exposed, in at least one embodiment, to software using a read special register instruction.

In at least one embodiment, a disclosed processor includes a level one (L1) instruction cache, a front-end to fetch and decode instructions from the L1 instruction cache, an L1 data cache, and an execution pipeline to execute decoded instructions. In some embodiments, the execution pipeline includes a CMA arithmetic logic unit (ALU). In at least one embodiment, a multiplier and an adder and CMA rounding logic to report a first rounding exception generated by the multiplier is included. In some embodiments, a register to store an address of an instruction responsive to the instruction generating a CMA rounding error exception is included. The CMA ALU may include fused multiply add (FMA) rounding logic to report a second rounding exception generated by the adder. In at least one embodiment, logic to generate a floating point exception signal based on the first rounding exception is included. Logic to generate a floating point exception signal based on the second rounding exception is included in some embodiments.

In at least one embodiment, a disclosed computer system includes processor and storage accessible to the processor. In some embodiments, the processor includes an L1 instruction cache, a front-end to fetch and decode instructions from the L1 instruction cache, an L1 data cache, and an execution pipeline to execute decoded instructions. In at least one embodiment, the execution pipeline includes a CMA ALU. In some embodiments, the CMA ALU includes a multiplier and an adder and CMA rounding logic to report a first rounding exception generated by the multiplier. In at least one embodiment, the storage includes processor executable code to cause the processor to perform operations. In at least one embodiment, the operations include identifying a code region eligible for CMA optimization and translating code region instructions into interpreter code instructions. In some embodiments, translating code region instructions into interpreter code instructions includes translating sequences of multiply add instructions in the code region instructions into fusion code including CMA instructions. In at least one embodiment, the operations include executing the interpreter code instructions and executing the fusion code, monitoring FP exceptions generated by the fusion code, and retranslating at least a portion of the code region instructions to eliminate the fusion code from the portion of the code region responsive to receiving a number of CMA intermediate rounding exceptions exceeding a predetermined threshold.

In some embodiments, the monitoring of FP exceptions generated by the fusion code includes determining, responsive to receiving the FP exception, if the FP exception is one of the CMA intermediate rounding exceptions and if the FP exception is one of the CMA intermediate rounding exceptions, determining if a CMA intermediate rounding exception corresponding to the FP exception is a first fault. In at least one embodiment, if the CMA intermediate rounding exception corresponding to the FP exception is a first fault, a CMA region counter is initialized. In at least one embodiment, if the CMA intermediate rounding exception corresponding to the FP exception is not a first fault, the CMA region counter is incremented and a determination is made if the CMA region counter has exceeded a predetermined threshold. In some embodiments, if the FP exception is not one of the CMA intermediate rounding exceptions, an FP exception treatment is performed. In at least one embodiment, multiple code regions eligible for CMA optimization are identified, interpreter code corresponding to each of the code regions is generated, each of the code regions is assigned its own CMA region counter, and individual code regions are translated without fusion code based on their corresponding CMA region counter. In at least one embodiment, the CMA region counter is periodically reset. In some embodiments, executing the interpreter code instructions includes executing a floating point multiply add sequence in a fused multiply add pipeline. The fused multiply add pipeline includes, in at least one embodiment, CMA rounding logic at an output of a CMA multiplier. In some embodiments, if the FP exception is one of the CMA intermediate rounding exceptions, a faulting CMA instruction ID is obtained, a CMA instruction counter is associated with the CMA instruction ID, the CMA intermediate rounding exceptions associated with the CMA instruction ID are counted, and if the CMA instruction counter has exceeded a predetermined threshold, retranslating with selective fusion code is performed and the fusion code for a particular CMA instruction that caused the exception is disabled. In at least one embodiment, the CMA instruction counter is periodically reset. In some embodiments, a CMA rounding error is reported to a CMA intermediate rounding exception IP register. The CMA intermediate rounding exception IP register is exposed, in at least one embodiment, to software using a read special register instruction.

In at least one embodiment, a disclosed computer readable storage medium includes processor-executable instructions to cause a processor to perform operations including identifying a code region eligible for CMA optimization and translating code region instructions into interpreter code instructions. In some embodiments, translating code region instructions into interpreter code instructions includes translating sequences of multiply add instructions in the code region instructions into fusion code including CMA instructions. In at least one embodiment, the operations include executing the interpreter code instructions and executing the fusion code, monitoring FP exceptions generated by the fusion code, and retranslating a least a portion of the code region instructions to eliminate the fusion code from the portion of the code region responsive to receiving a number of CMA intermediate rounding exceptions exceeding a predetermined threshold. In some embodiments, the monitoring of FP exceptions generated by the fusion code includes determining, responsive to receiving the FP exception, if the FP exception is one of the CMA intermediate rounding exceptions and if the FP exception is one of the CMA intermediate rounding exceptions, determining if a CMA intermediate rounding exception corresponding to the FP exception is a first fault. In at least one embodiment, if the CMA intermediate rounding exception corresponding to the FP exception is a first fault, a CMA region counter is initialized.

In at least one embodiment, if the CMA intermediate rounding exception corresponding to the FP exception is not a first fault, the CMA region counter is incremented and a determination is made if the CMA region counter has exceeded a predetermined threshold. In some embodiments, if the FP exception is not one of the CMA intermediate rounding exceptions, an FP exception treatment is performed. In at least one embodiment, multiple code regions eligible for CMA optimization are identified, interpreter code corresponding to each of the code regions is generated, each of the code regions is assigned its own CMA region counter, and individual code regions are translated without fusion code based on their corresponding CMA region counter. In at least one embodiment, the CMA region counter is periodically reset. In some embodiments, executing the interpreter code instructions includes executing a floating point multiply add sequence in a fused multiply add pipeline. The fused multiply add pipeline includes, in at least one embodiment, CMA rounding logic at an output of a CMA multiplier. In some embodiments, if the FP exception is one of the CMA intermediate rounding exceptions, a faulting CMA instruction ID is obtained, a CMA instruction counter is associated with the CMA instruction ID, the CMA intermediate rounding exceptions associated with the CMA instruction ID are counted, and if the CMA instruction counter has exceeded a predetermined threshold, retranslating with selective fusion code is performed and the fusion code for a particular CMA instruction that caused the exception is disabled. In at least one embodiment, the CMA instruction counter is periodically reset. In some embodiments, a CMA rounding error is reported to a CMA intermediate rounding exception IP register. The CMA intermediate rounding exception IP register is exposed, in at least one embodiment, to software using a read special register instruction.

In the following description, details are set forth in conjunction with embodiments to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

Embodiments may be implemented in many different system types and platforms. FIG. 1 illustrates a computer system used in conjunction with at least one embodiment. In at least one embodiment, a multi-processor system includes a first processor 170-1 and a second processor 170-2. Although some embodiments include two processors 170, other embodiments may include more or fewer processors. In at least one embodiment, each processor 170 includes a core region 178 and an integration region 180. In some embodiments, core region 178 includes one or more processing cores 174. In at least one embodiment, integration region 180 includes a memory controller hub (MCH) 172, a processor-hub point-to-point interface 176, and a processor-processor point-to-point interface 173.

In at least one embodiment, MCH 172 supports bidirectional transfer of data between a processor 170 and a system memory 132 via a memory interconnect 182. In some embodiments, system memory 132 may be a double-data rate (DDR) type dynamic random-access memory (DRAM) while memory interconnect 182 and MCH 172 may comply with a DDR interface specification. In some embodiments, system memory 132-1 may include a bank of memory interfaces populated with corresponding memory devices or boards.

In some embodiments, system 100 is a distributed memory embodiment in which each processor 170 communicates with a local portion of system memory 132. In at least one embodiment, system memory 132-1 is local to processor 170-1 and represents a portion of the system memory 132 as a whole, which is a shared memory space. In some embodiments, each processor 170 can access each portion of system memory 132, whether local or not. While local accesses may have lower latency, accesses to non-local portions of system memory 132 are permitted in some embodiments.

In at least one embodiment, each processor 170 also includes a point-to-point interface 173 that supports communication of information with a point-to-point interface 173 of one of the other processors 170 via an inter-processor point-to-point interconnection 151. In some embodiments, processor-hub point-to-point interconnections 152 and processor-processor point-to-point interconnections 151 are distinct instances of a common set of interconnections. In other embodiments, point-to-point interconnections 152 may differ from point-to-point interconnections 151.

In at least on embodiment, processors 170 includes point-to-point interfaces 176 to communicate via point-to-point interconnections 152 with a point-to-point interface 194 of an I/O hub 190. In some embodiments, I/O hub 190 includes a graphics interface 192 to support bidirectional communication of data with a graphics adapter 138 via a graphics interconnection 116, which may be implemented as a high speed serial bus, e.g., a peripheral components interface express (PCIe) bus or another suitable bus.

In some embodiments, I/O hub 190 also communicates, via an interface 196 and a corresponding interconnection 156, with a bus bridge hub 118 that supports various bus protocols for different types of I/O devices or peripheral devices. In at least one embodiment, bus bridge hub 118 supports a network interface controller (NIC) 130 that implements a packet-switched network communication protocol (e.g., Gigabit Ethernet), a sound card or audio adapter 133, and a low bandwidth bus 122 (e.g., low pin count (LPC), I2C, Industry Standard Architecture (ISA)), to support legacy interfaces referred to herein as desktop devices 124 that might include interfaces for a keyboard, mouse, serial port, parallel port, and/or a removable media drive. In at least one embodiment, low bandwidth bus 122 further includes an interface for a nonvolatile memory (NVM) device such as flash read only memory (ROM) 126, and a storage protocol bus 121 (e.g., serial AT attachment (SATA), small computer system interface (SCSI)), to support persistent storage 128, including but not limited to magnetic core hard disk drives (HDD), and a solid state drive (SSD). In at least one embodiment, persistent storage 128 includes code 129 including processor-executable instructions that processor 170 may execute to perform various operations. In some embodiments, code 129 may include, but is not limited to, operating system (OS) code and application program code. In at least one embodiment, system 100 also includes nonvolatile (NV) RAM 140, including but not limited to an SSD and a phase change RAM (PRAM). In some embodiments, system 100 also includes a peripheral bus 120 (e.g., USB, PCI, PCIe) to support various peripheral devices and sensors, including I/O devices 112 (e.g., keyboard, mouse).

Although specific instances of communication busses and bus targets have been illustrated and described, other embodiments may employ different communication busses and different target devices. Similarly, although in some embodiments, computer system 100 includes one or more processors 170 and a chipset 189 that includes an I/O hub 190 with an integrated graphics interface, and a bus bridge hub supporting other I/O interfaces, in other embodiments, computer system 100 may include MCH 172 which is integrated in I/O hub 190 and may include graphics interface 192 which is integrated in processor 170. In some embodiments, integrated MCH 172 and graphics interface 192 in processor 170, I/O hub 190 and bus bridge hub 118 may be integrated into a single-piece chipset 189.

Figure 2:
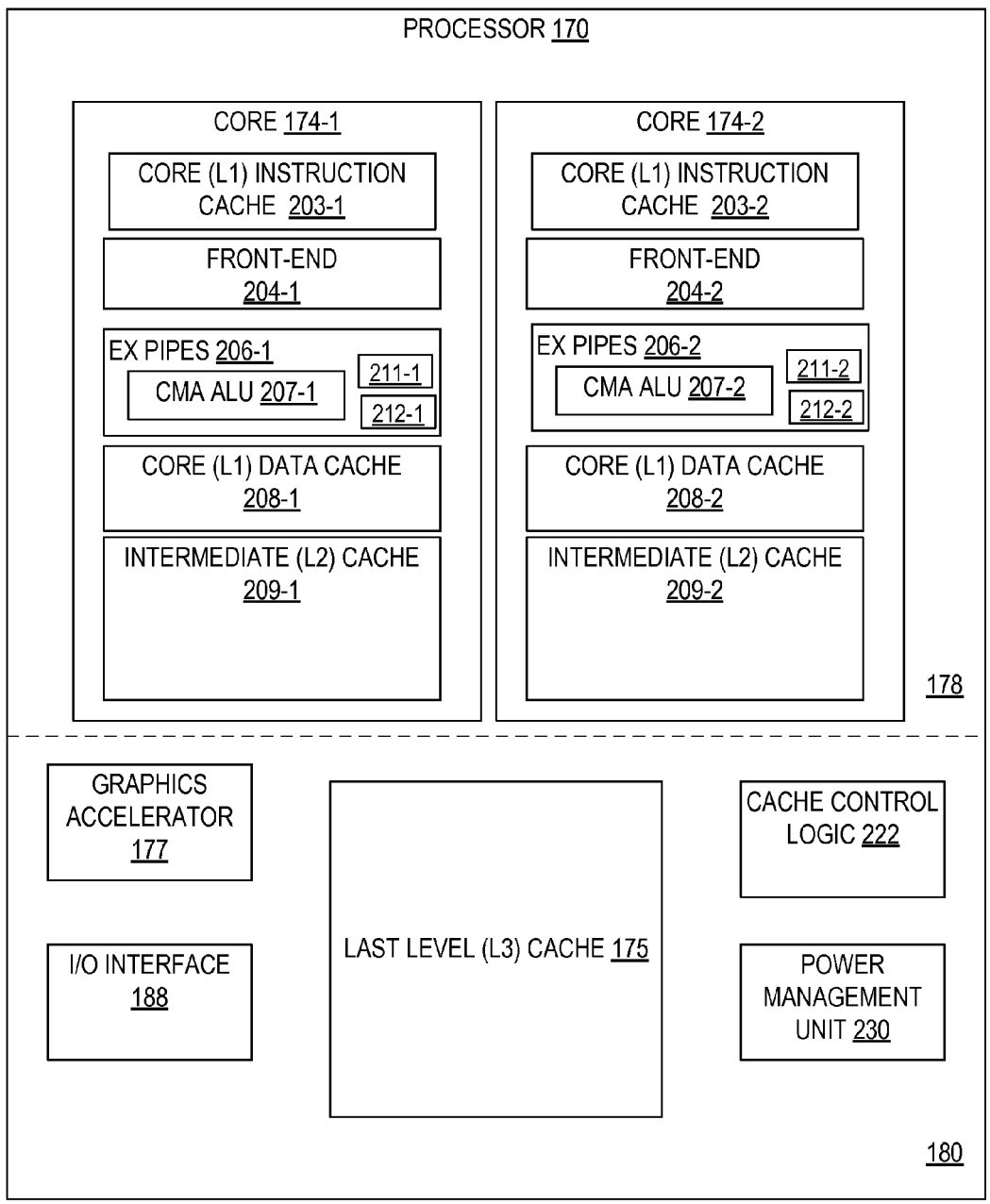
FIG. 2 illustrates a processor used in conjunction with at least one embodiment.

FIG. 2 illustrates a processor used in conjunction with at least one embodiment. In at least one embodiment, processor 170 includes a core region 178 and an integration region 180. In some embodiments, core region 178 includes processing cores 174-1 and 174-2. In other embodiments, processor 170 may include more or fewer processing cores 174.

In at least one embodiment, each processing core 174 includes a core or level 1 (L1) instruction cache 203, a front-end 204, execution pipes 206, a core or L1 data cache 208, and an intermediate or level 2 (L2) cache 209. In some embodiments, front-end 204 receives or generates program flow information including an instruction pointer and branch predictions, fetches or prefetches instructions from core instruction cache 203 based on the program flow information it receives, and issues instructions to execution pipes 206. In at least one embodiment, front-end 204 may also perform instruction decoding to identify operation codes, identify source and destination registers, and identify any memory references. In some embodiments, execution pipes 206 may include multiple parallel execution pipelines including one or more floating point pipelines, one or more integer arithmetic logic unit pipelines, one or more branch pipelines, and one or more memory access pipelines, also referred to herein as load/store pipelines. In at least one embodiment, execution pipes 206 may generate micro code to process the instructions from core instruction cache 203, route instructions through the appropriate execution pipeline, and store any results in destination registers. In some embodiments, execution pipes 206 may encompass a register file that may support register renaming, speculative execution, and out-of-order execution of instructions.

In at least one embodiment, execution pipe 206 includes a CMA ALU 207, a CMA region counter 211, and a CMA instruction counter 212.

In some embodiments, integration region 180 includes a last level (L3) cache (LLC) 175 and cache control logic 222. In at least one embodiment, LLC 175 is a shared resource for all of processing cores 174 of processor 170. In some embodiments, As suggested by its name, LLC 175 represents, from the perspective of processor 170, the last available hierarchical tier of cache memory. In some embodiments, if a memory access instruction that is presented to LLC 175 generates a cache miss, the requested data must be retrieved from system memory 132.

In some embodiments, processing core 174 and/or integration region 180 may include one or more levels of a cache hierarchy between core caches 203, 208, intermediate cache 209, and LLC 175. In at least one embodiment, each of the cache memories of processing core 174 may have a unique architectural configuration. In at least one embodiment, core data cache 208, intermediate cache 209 and LLC 175 are multiple-way, set associative caches. In some embodiments, LLC 175 is inclusive with respect to intermediate cache 209 while, in other embodiments, LLC 175 may be exclusive or non-inclusive with respect to core data cache 208. Similarly, intermediate cache 209 may, in some embodiments, be either inclusive or non-inclusive with respect to core data cache 208, core instruction cache 203, or both.

In at least one embodiment, cache control logic 222 controls access to the cache memories, enforces a coherency policy, implements a replacement policy, and monitors memory access requests from external agents, e.g., other processors 170 or I/O devices. In at least one embodiment, LLC 175, intermediate cache 209, and core caches 203, 208 comply with the MESI protocol or a modified MESI protocol. The four states of the MESI protocol are described in Table 1.

TABLE 1

Description of Cacheline States in the MESI Protocol

| MESI State | Description |
| --- | --- |
| Modified | The cache line contains valid data that is modified from the system memory copy of the data. Also referred to as a 'dirty' line. |
| Exclusive | The line contains valid data that is the same as the system memory copy of the data. Also indicates that no other cache has a line allocated to this same system memory address. Also referred to as a 'clean' line. |
| Shared | The line contains valid and clean data, but one or more other caches have a line allocated to this same system memory address. |
| Invalid | The line is not currently allocated and is available for storing a new entry. |

In some embodiments, the cache memories of processor 170 may implement a modified MESI protocol, which might include, in one embodiment, an "F" state identifying one of a plurality of "S" state lines, where the "F" state line is designated as the line to forward the applicable data should an additional request for the data be received, e.g., from a processor that does not have the data.

In at least one embodiment, integration region 180 of processor 170 also includes power management unit 230 to control power provided to the various resources of processor 170. In some embodiments, power management unit 230 provides unique power supply levels to core region 178 and integration region 180. In other embodiments, power management unit 230 may be further operable to provide unique power supply levels to each processing core 174 and/or provide clock signals at unique frequencies to processing cores 174. In addition, in some embodiments, power management unit 230 may implement various power states for processor 170 and define or respond to events that produce power state transitions.

In some embodiments, integration region 180 includes graphics accelerator 177 to support low latency, high bandwidth communication with a display device (not depicted). In other embodiments, graphics accelerator 177 may be implemented in an I/O hub or other chipset device.

In at least one embodiment, integration region 180 includes an I/O interface 188 to support communication with one or more chipset devices, discreet bus interfaces, and/or individual I/O devices. In some embodiments, I/O interface 188 provides one or more point-to-point interfaces. In other embodiments, I/O interface 188 may provide an interface to a shared bus to which one or more other processors 170 may also connect.

In at least one embodiment, CMA ALU 207 represents an embodiment of FMA logic. FMA logic refers to special purpose logic designed to accept three FP input operands and produce an FP output representing the sum of the third operand and the product of the first two operands, i.e., (A*B+C).

However, the result may not precisely match the output of the result produced by a simple FP multiply followed by a simple FP add when the rounding of the 2-input multiplication in the simple result results in a discrepancy. In at least one embodiment, CMA ALU 207 includes rounding logic at the output of the multiplier to mimic the result of the simple multiply add sequence. In at least one embodiment, this rounding logic is able to detect any floating point exceptions, faults, errors, or other conditions that arise during the rounding process with respect to the floating point multiplication. In some embodiments, this feature beneficially enables processor 170 to invoke an exception handler and take appropriate action. In at least one embodiment, floating point rounding errors are monitored in particular to determine whether the overhead associated with handling these intermediate rounding errors exceeds the benefit associated with the CMA hardware.

Figure 3A:
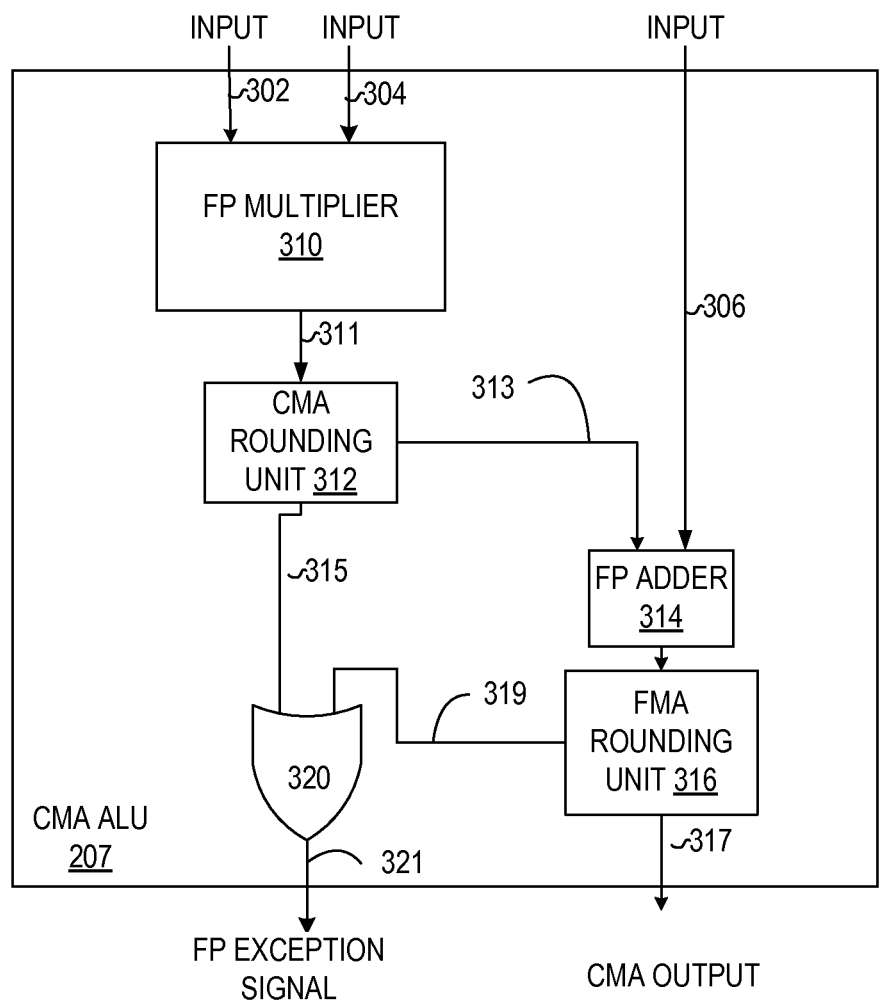
FIG. 3A and FIG. 3B illustrate one embodiment of a complex FP ALU.
Figure 3B:
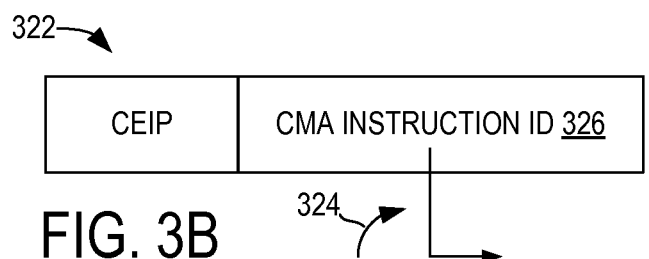

FIG. 3A and FIG. 3B illustrate one embodiment of a complex FP ALU. In at least one embodiment, CMA ALU 207 performs a 3-input FP multiply add operation to obtain a result representing the product of two of the inputs added to the third input. In at least one embodiment, CMA ALU 207 receives FP inputs 302, 304 and 306 and includes an FP multiplier 310, a CMA rounding unit 312, an FP adder 314 and an FMA rounding unit 316. In some embodiments, FP multiplier 310 receives FP inputs 302 and 304 as input operands, performs an FP multiplication, and outputs the product as FP output 311. In at least one embodiment, the output is then processed by CMA rounding unit 312 to generate FP multiply output 313. FP multiply output 313 may be referred to herein as intermediate product 313.

In at least one embodiment, FP multiply output 313 is routed to FP adder 314. In at least one embodiment, CMA rounding unit 312 determines whether intermediate product 313 differs from the output that would be generated by a conventional FP rounding unit and generates a signal, referred to FP multiply exception signal 315, to indicate the result of its determination. In some embodiments, FP multiply exception signal 315 includes any exceptions, faults, or error conditions that arose as a result of inaccurate rounding for the FP multiplication of inputs 302 and 304.

In some embodiments, FP output 313 is also provided as one input to FP adder 314, which receives FP input 306 as its second input. In at least one embodiment, FP adder 314 performs an FP addition of input 306 and output 313 and generates an FP output that is delivered to FMA rounding unit 316, generating CMA output 317. Like any FP operation, in some embodiments, FP adder 314 can also generate exceptions unrelated to rounding (adder exception signal 319). In some embodiments, FP multiply exception signal 315 and FP exception signal 319 are processed via gate 320 to generate a generic exception signal 321.

In at least one embodiment, CMA ALU 207 accesses resources (shown in FIG. 3B) including CMA intermediate rounding exception ID (CEIP) register 322 containing information identifying the instruction that caused CMA rounding exception. In at least one embodiment, CEIP register 322 is exposed to the software through special register reader instruction 324 in order to obtain the faulting CMA instruction ID 326.

Figure 4A:
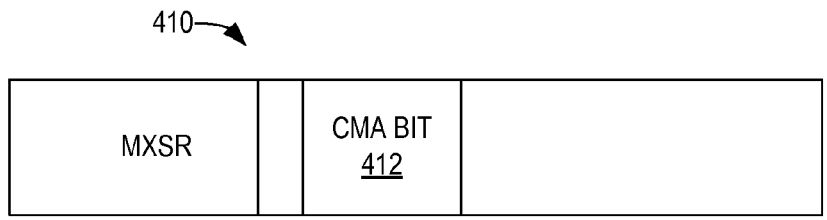
FIG. 4A, FIG. 4B, and FIG. 4C illustrate one embodiment of an exception handling method.
Figure 4B:
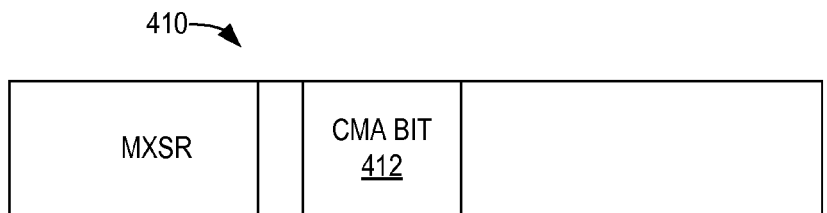
Figure 4C:
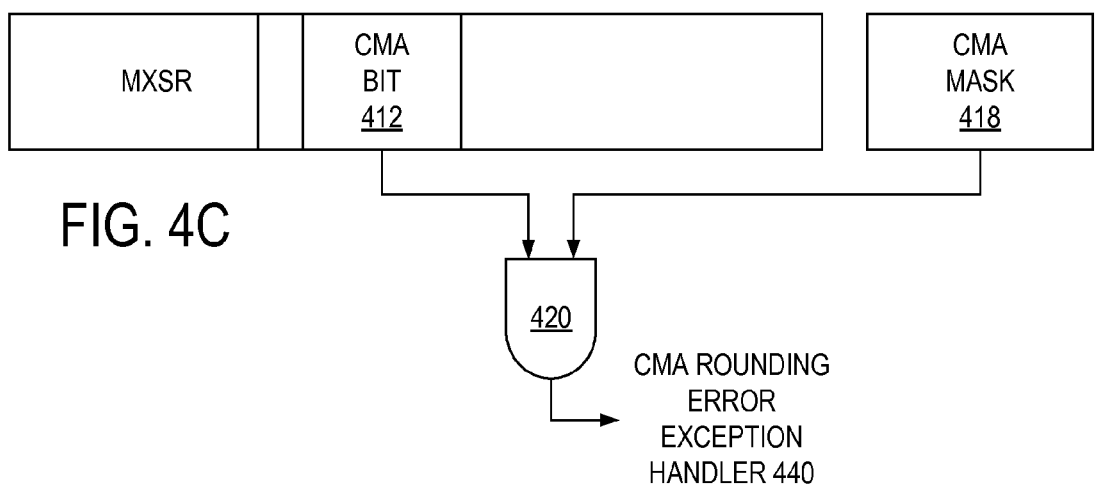

FIG. 4A, FIG. 4B, and FIG. 4C illustrate one embodiment of an exception handling method. FIG. 4A illustrates the reporting of a CMA rounding error by CMA bit in triggering MXSR register. In at least on embodiment, CMA bit 412 is used to report CMA traps and no other instruction may modify its value. FIG. 4B illustrates a method of trapping on a CMA rounding error by testing the contents of triggering MXSR register by using a special register reader instruction.

In at least one embodiment, if information from the CMA bit 412 or other FP bits in MXSR register 410 confirms, via gate 416, that a fault has occurred, an FP exception is generated that triggers FP exception handler 430. FIG. 4C illustrates a method of distinguishing CMA intermediate rounding exceptions from FP exceptions. In at least one embodiment, the content of the triggering MXSR register 410 is tested inside FP exception handler 430, including the CMA bit 412, using a read special register instruction. In some embodiments, in order to identify faulty instructions, the exception handler matches the content obtained from MXSR register 410 against software CMA mask 418 via logical operation 420. In some embodiments, if the logical operation confirms that there has been a CMA rounding fault, the CMA rounding error exception handler 440 is called.

Figure 5:
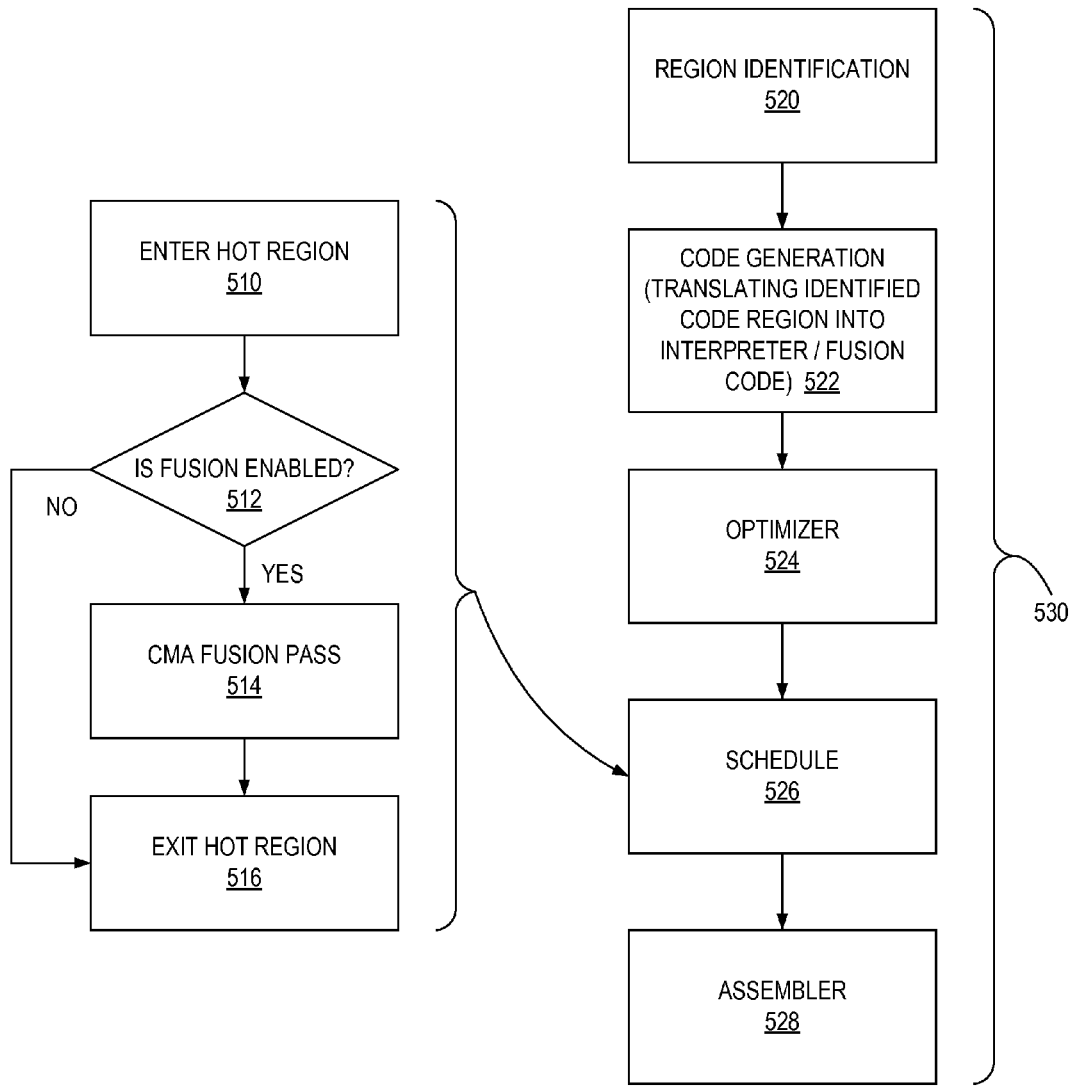
FIG. 5 illustrates one embodiment of a method to optimize FP code.

FIG. 5 illustrates one embodiment of a method to optimize FP code. In at least one embodiment, a binary optimizer performs operations (530) including operations to identify frequently executed hot code regions (block 520). In at least one embodiment, once execution data flows within the hot code region are identified (block 520), machine-specialized code is generated for each data flow (block 522), (including translating identified code region instructions into interpreter code instructions, including translating the code region instructions into fusion code including CMA instructions), code is manipulated and optimized to fit the characteristics of the machine (block 524), instructions within the specialized and optimized code are statically scheduled according to their execution latencies (block 526) and the output code is assembled in machine language (block 528). In some embodiments, the binary optimizer operations (530) are used to implement macro fusion as an optimization pass in block 526. Once the hot region is entered (block 510), a determination is made to see if fusion is enabled (block 512) in some embodiments. In some embodiments, fusion may be disabled if a CMA intermediate rounding exception happens frequently in a hot code region. In at least one embodiment, if it is determined that fusion is not enabled in block 512, then the hot region is exited (block 516). In some embodiments, if a determination is made that fusion is enabled in block 512, then a CMA fusion pass is performed (block 514) and the hot region is exited (block 516).

Figure 6:
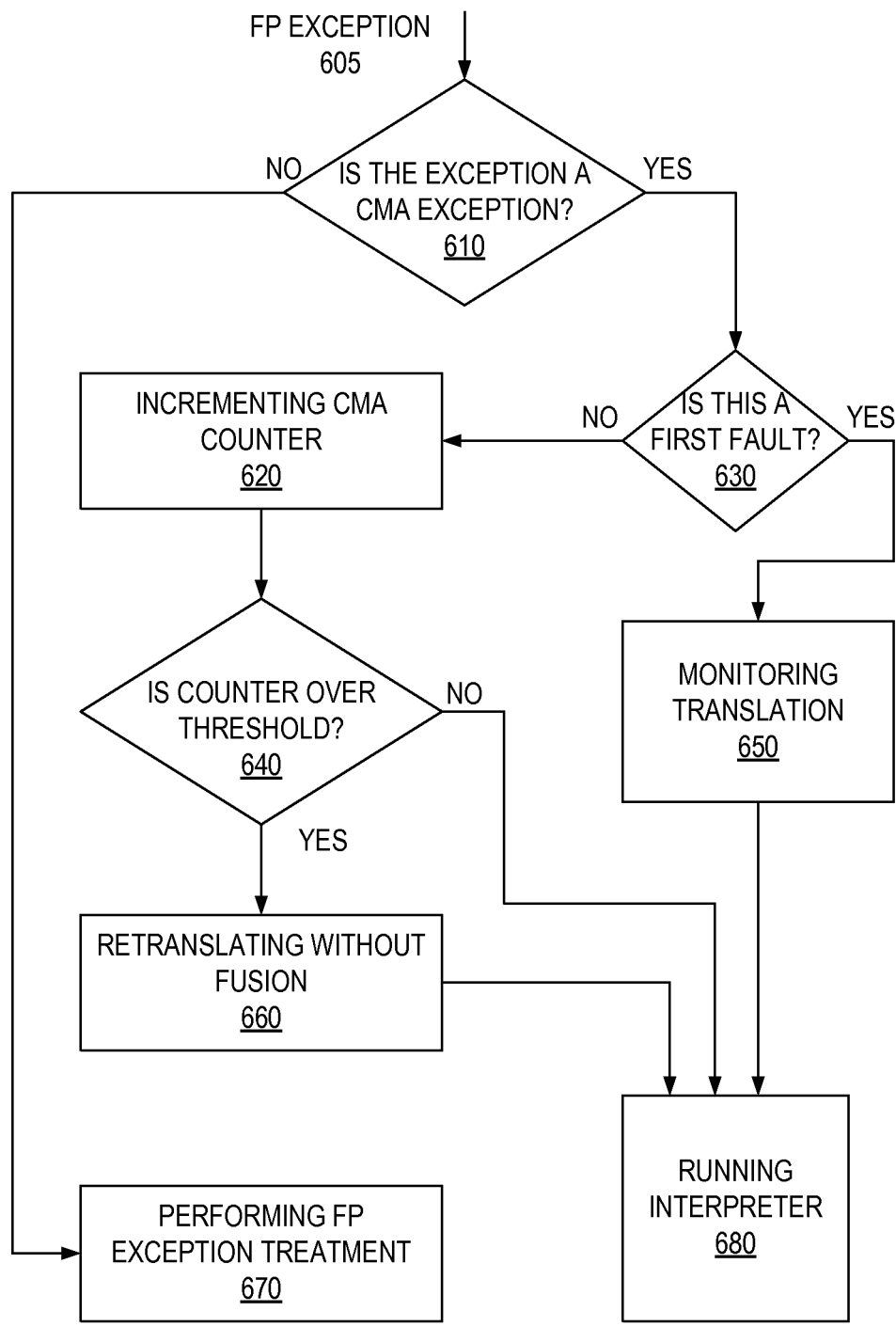
FIG. 6 illustrates one embodiment of a method to manage intermediate rounding exceptions generated by a complex FP ALU.

FIG. 6 illustrates one embodiment of a method to manage CMA intermediate rounding exceptions at the granularity of an optimized region. In at least one embodiment, the first time an optimized region is reporting an FP exception (block 605), the system starts monitoring its behavior. In one embodiment, a determination 610 is made if the FP exception (block 605) is a CMA intermediate rounding exception. In some embodiments, if a determination is made that the FP exception is not a CMA intermediate rounding exception, then an FP exception treatment is performed (block 670). In at least one embodiment, if it is a CMA intermediate rounding exception, a determination needs to be made if this is a first fault (block 630). If it is determined that the CMA intermediate rounding exception is a first fault, in some embodiments, the handler sets CMA region counter 211 to one, translation is monitored (block 650) and the interpreter is run (block 680).

In at least one embodiment, if a determination is made in block 630 that CMA intermediate rounding exception is not a first fault, the CMA region counter 211 is incremented (block 620). In some embodiments, a determination is made (block 640) if the CMA region counter 211 is over a predetermined threshold. In at least one embodiment, if the CMA region counter 211 has not exceeded the predetermined threshold, the interpreter is run (block 680). In some embodiments, if it is determined in block 640 that the CMA region counter 211 has exceeded the predetermined threshold, retranslation is performed without fusion (block 660) and the interpreter is run (block 680).

Figure 7:
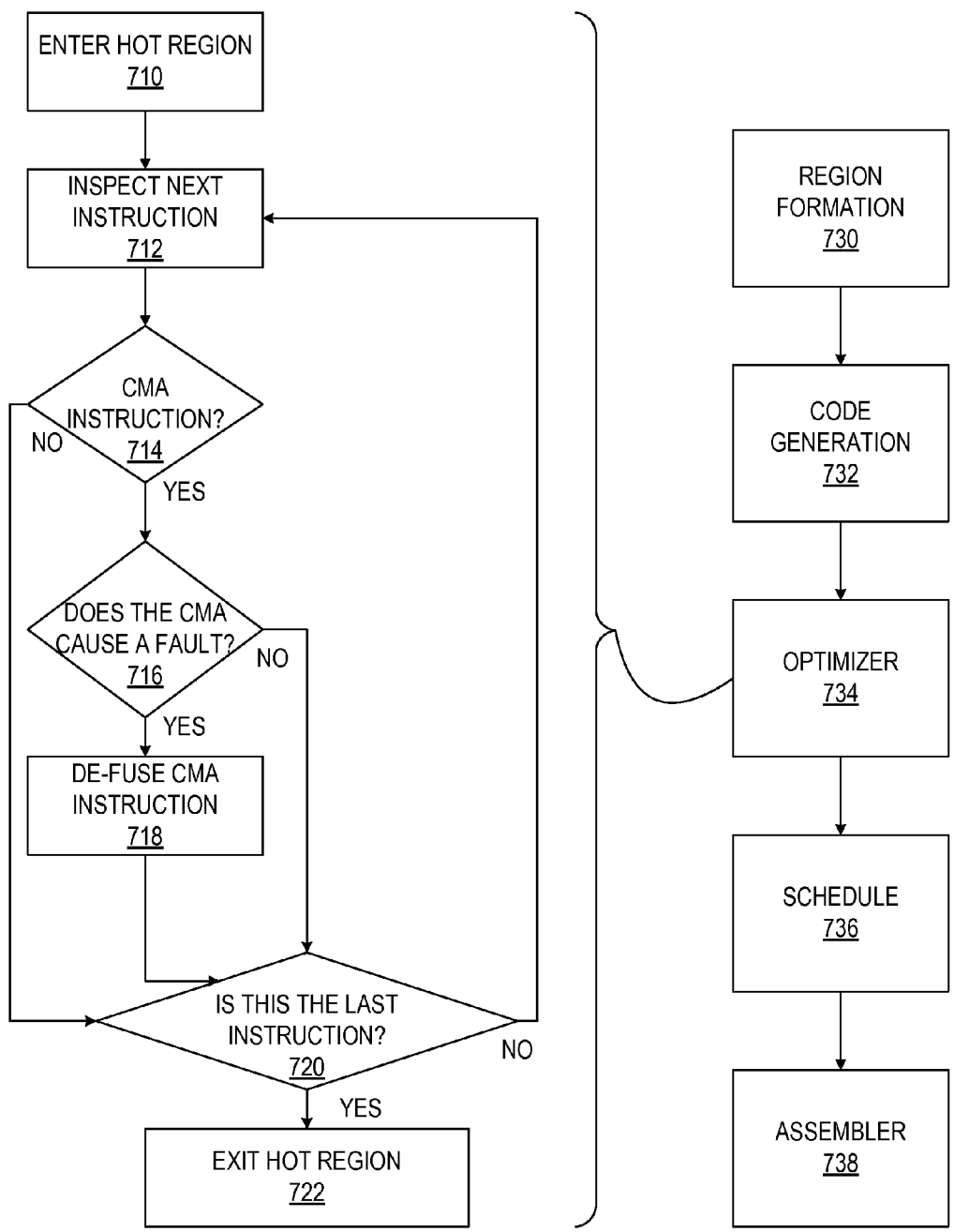
FIG. 7 illustrates one embodiment of a method to optimize execution of FP code.

FIG. 7 illustrates one embodiment of a method of re-optimization of a region by enabling selectively the macrofusion optimization pass on non-faulty sequences. In at least one embodiment, a binary optimizer or a JIT compiler is used to identify frequently executed hot regions (block 730). In some embodiments, once identified, execution data flows within the hot code region are formed (block 730), machine-specialized code is generated for each data flow (block 732), code is manipulated and optimized to fit the characteristics of the machine (block 734), instructions within the specialized and optimized code are statically scheduled according to their execution latencies (block 736) and the output code is assembled in machine language (block 738). In some embodiments, the binary optimizer (block 734) is used to implement macro fusion as an optimization pass.

In at least one embodiment, once the hot region (block 710) is entered, the macro fusion optimization pass inspects instructions in the data flow of the hot region in block 712. In some embodiments, a determination is next made to see if the sequence is a CMA instruction (block 714). In at least one embodiment, if a determination is made that the sequence is not a CMA, then the flow continues on to check whether the instruction is the last instruction of the hot region (block 720). In some embodiments, if the sequence is a CMA instruction, then a determination is made if the CMA causes a fault (block 716). If not, the flow continues to block 720, in some embodiments, to evaluate if the instruction is the last in the data flow. In at least one embodiment, if a determination is made that the CMA does cause a fault, the instruction is de-fused, keeping the original FP multiply add sequence (block 718) and the flow continues to block 720. In some embodiments, after all the actions of the instruction are performed, a determination is made to evaluate if the instruction is the last in the hot region. If it is determined that the instruction is the last in the hot region, then, in some embodiments, the macro fusions ends by exiting the hot region in block 722. Otherwise, in some embodiments, the flow returns to block 712 to inspect the next instruction in the data flow.

Figure 8:
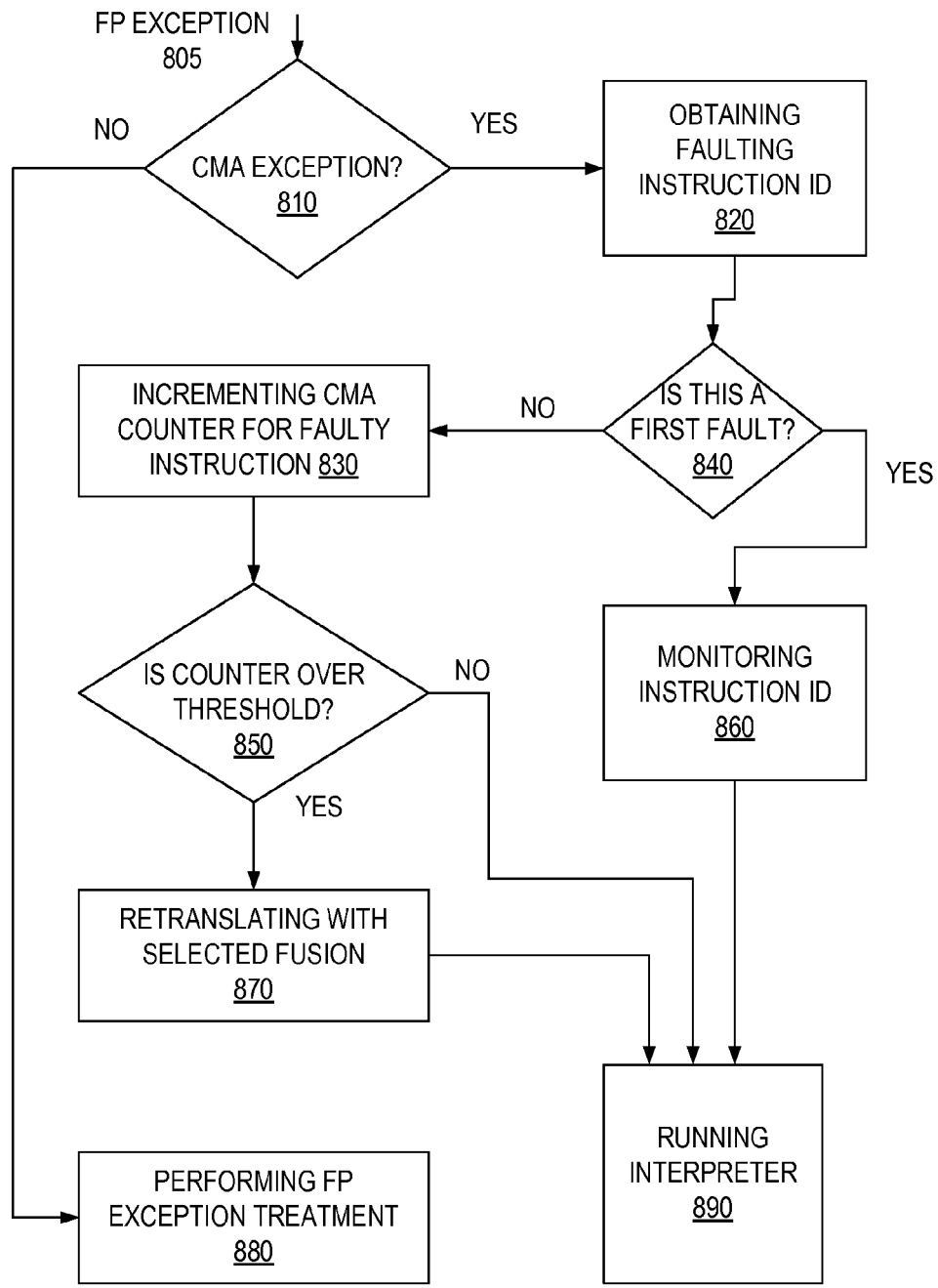
FIG. 8 illustrates one embodiment of a method to manage intermediate rounding exceptions generated by a complex FP ALU.

FIG. 8 illustrates one embodiment of a method to manage CMA intermediate rounding exceptions at the granularity of an instruction. In at least one embodiment, the first time a CMA instruction is reporting an FP exception (block 805), the system starts monitoring its behavior. In some embodiments, a determination is made to see if the FP exception is a CMA intermediate rounding exception (block 810). In some embodiments, if a determination is made that the FP exception is not a CMA intermediate rounding exception, then an FP exception treatment is performed (block 880). In at least one embodiment, if it is a CMA intermediate rounding exception, the faulting instruction ID is obtained (block 820). In some embodiments, a determination is next made if this CMA intermediate rounding exception is a first fault produced by that particular instruction (block 840). In some embodiments, if it is determined that the CMA intermediate rounding exception is a first fault, then CMA instruction counter 212 is set to one and that particular instruction is monitored (block 860) and the interpreter is run (block 890).

In at least one embodiment, if a determination is made in block 840 that the CMA intermediate rounding exception is not a first fault for that particular instruction, CMA instruction counter 212 for that given instruction is incremented (block 830). In some embodiments, a determination is made (block 850) if CMA instruction counter 212 is over a predetermined threshold. In some embodiments, if CMA instruction counter 212 has not exceeded the predetermined threshold, the interpreter is run (block 890). In some embodiments, if it is determined in block 850 that CMA instruction counter 212 has exceeded the predetermined threshold, retranslation is performed with selective fusion as illustrated in FIG. 7 (block 870) and the interpreter is run (block 890). In some embodiments, selective fusion generates CMA instructions for any fusion candidate, but the instructions identified are prone to rounding faults.

Figure 9:
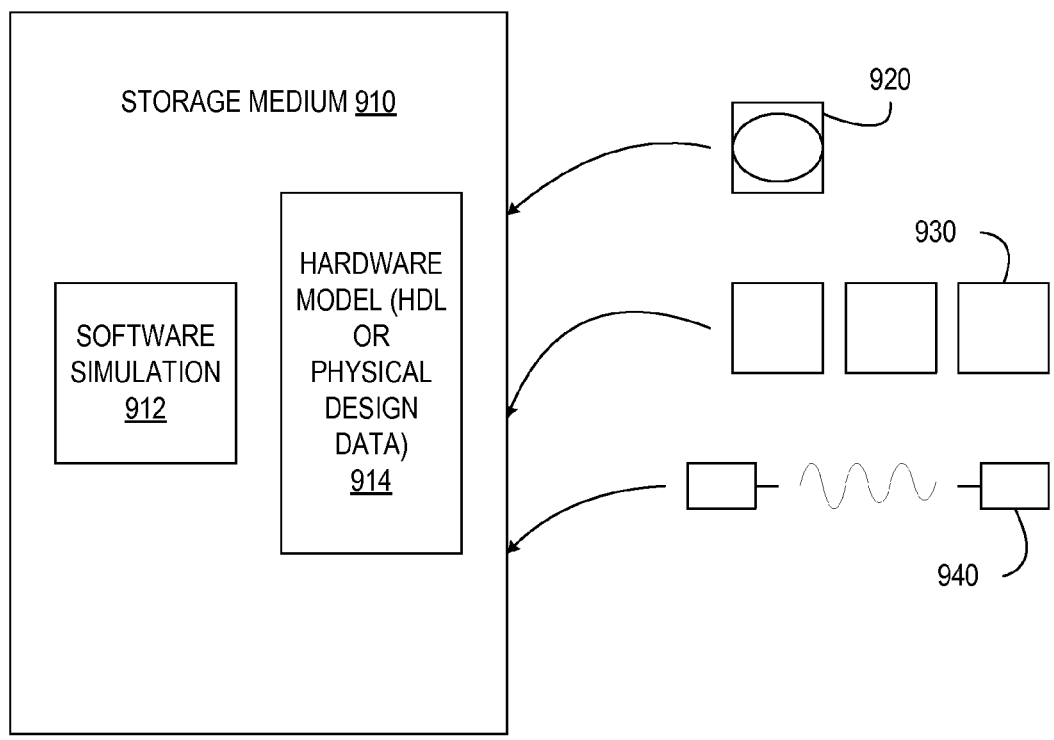
FIG. 9 illustrates a representation for simulation, emulation and fabrication of a design implementing the disclosed techniques.

FIG. 9 illustrates a representation for simulation, emulation and fabrication of a design implementing the disclosed techniques. Data representing a design may represent the design in a number of manners. First, as is useful in simulations, the hardware may be represented using a hardware description language or another functional description language which basically provides a computerized model of how the designed hardware is expected to perform. In at least one embodiment, the hardware model 914 may be stored in a storage medium 910 such as a computer memory so that the model may be simulated using simulation software 912 that applies a particular test suite to the hardware model 914 to determine if it indeed functions as intended. In some embodiments, the simulation software 912 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. In some embodiments, an optical or electrical wave 940 modulated or otherwise generated to transmit such information, a memory 930, or a magnetic or optical storage 920 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

The following pertain to further embodiments.

Embodiment 1 is an error handling method comprising identifying a code region eligible for CMA optimization; translating code region instructions into interpreter code instructions, including translating sequences of multiply add instructions in the code region instructions into fusion code comprising CMA instructions; executing the interpreter code instructions, including executing the fusion code; monitoring FP exceptions generated by the fusion code; and retranslating at least a portion of the code region instructions to eliminate the fusion code from the portion of the code region responsive to receiving a number of CMA intermediate rounding exceptions exceeding a predetermined threshold.

In embodiment 2, the monitoring of FP exceptions generated by the fusion code included in the subject matter of embodiment 1 can optionally include responsive to receiving the FP exception, determining if the FP exception is one of the CMA intermediate rounding exceptions; and responsive to determining that the FP exception is one of the CMA intermediate rounding exceptions: determining if a CMA intermediate rounding exception corresponding to the FP exception is a first fault; responsive to determining that the CMA intermediate rounding exception corresponding to the FP exception is a first fault, initializing a CMA region counter; and responsive to determining that the CMA intermediate rounding exception corresponding to the FP exception is not a first fault: incrementing the CMA region counter; and determining if the CMA region counter has exceeded a predetermined threshold.

In embodiment 3, the subject matter of embodiment 2 can optionally include responsive to determining that the FP exception is not one of the CMA intermediate rounding exceptions, performing an FP exception treatment.

In embodiment 4, the subject matter of embodiment 2 can optionally include identifying multiple code regions eligible for CMA optimization; generating interpreter code corresponding to each of the code regions; assigning each of the code regions its own CMA region counter; and retranslating individual code regions without fusion code based on their corresponding CMA region counter.

In embodiment 5, the subject matter of embodiment 2 can optionally include periodically resetting the CMA region counter.

In embodiment 6, the executing of the interpreter code instructions included in the subject matter of embodiment 1 can optionally include executing a floating point multiply add sequence in a fused multiply add pipeline.

In embodiment 7, the fused multiply add pipeline included in the subject matter of embodiment 6 can optionally include CMA rounding logic at an output of a CMA multiplier.

In embodiment 8, the subject matter of embodiment 2 can optionally include responsive to determining that the FP exception is one of the CMA intermediate rounding exceptions: obtaining a faulting CMA instruction ID; associating a CMA instruction counter with the CMA instruction ID; counting the CMA intermediate rounding exceptions associated with the CMA instruction ID; and responsive to determining that the CMA instruction counter has exceeded a predetermined threshold: retranslating with selective fusion code; and disabling the fusion code for a particular CMA instruction that caused the exception.

In embodiment 9, the CMA instruction counter included in the subject matter of embodiment 8 is optionally periodically reset.

In embodiment 10, the subject matter of embodiment 8 can optionally include a CMA rounding error reported to a CMA intermediate rounding exception IP register.

In embodiment 11 the CMA intermediate rounding exception IP register included in the subject matter of embodiment 10 is optionally exposed to software using a read special register instruction.

Embodiment 12 is a processor comprising a L1 instruction cache; a front-end to fetch and decode instructions from the L1 instruction cache; an L1 data cache; and an execution pipeline to execute decoded instructions, wherein the execution pipeline includes a CMA ALU, including a multiplier and an adder and CMA rounding logic to report a first rounding exception generated by the multiplier.

In embodiment 13, the subject matter of embodiment 12 can optionally include a register to store an address of an instruction responsive to the instruction generating a CMA rounding error exception.

In embodiment 14, the CMA ALU included in the subject matter of embodiment 12 can optionally include FMA rounding logic to report a second rounding exception generated by the adder.

In embodiment 15, the subject matter of embodiment 14 can optionally include logic to generate a floating point exception signal based on the first rounding exception.

In embodiment 16, the subject matter of embodiment 15, can optionally include logic to generate a floating point exception signal based on the second rounding exception.

Embodiment 17 is a computer system comprising a processor comprising: a L1 instruction cache; a front-end to fetch and decode instructions from the L1 instruction cache; an L1 data cache; and an execution pipeline to execute decoded instructions, wherein the execution pipeline includes a CMA ALU, including a multiplier and an adder and CMA rounding logic to report a first rounding exception generated by the multiplier; and storage accessible to the processor; wherein the storage includes processor executable code to cause the processor to perform operations comprising: identifying a code region eligible for CMA optimization; translating code region instructions into interpreter code instructions, including translating sequences of multiply add instructions in the code region instructions into fusion code comprising CMA instructions; executing the interpreter code instructions, including executing the fusion code; monitoring FP exceptions generated by the fusion code; and retranslating a least a portion of the code region instructions to eliminate the fusion code from the portion of the code region responsive to receiving a number of CMA intermediate rounding exceptions exceeding a predetermined threshold.

In embodiment 18, the monitoring of FP exceptions generated by the fusion code included in the subject matter of embodiment 17 can optionally include responsive to receiving the FP exception, determining if the FP exception is one of the CMA intermediate rounding exceptions; and responsive to determining that the FP exception is one of the CMA intermediate rounding exceptions: determining if a CMA intermediate rounding exception corresponding to the FP exception is a first fault; responsive to determining that the CMA intermediate rounding exception corresponding to the FP exception is a first fault, initializing a CMA region counter; and responsive to determining that the CMA intermediate rounding exception corresponding to the FP exception is not a first fault: incrementing the CMA region counter; and determining if the CMA region counter has exceeded a predetermined threshold.

In embodiment 19, the storage included in the subject matter of embodiment 18 can optionally include processor executable code to cause the processor to perform operations comprising: responsive to determining that the FP exception is not one of the CMA intermediate rounding exceptions, performing an FP exception treatment.

In embodiment 20, the storage included in the subject matter of embodiment 18 can optionally include processor executable code to cause the processor to perform operations comprising: identifying multiple code regions eligible for CMA optimization; generating interpreter code corresponding to each of the code regions; assigning each of the code regions its own CMA region counter; and retranslating individual code regions without fusion code based on their corresponding CMA region counter.

In embodiment 21, the storage included in the subject matter of embodiment 18 can optionally include processor executable code to cause the processor to perform operations comprising periodically resetting the CMA region counter.

In embodiment 22, the executing of the interpreter code instructions included in the subject matter of embodiment 17 can optionally include executing a floating point multiply add sequence in a fused multiply add pipeline.

In embodiment 23, the fused multiply add pipeline included in the subject matter of embodiment 22 can optionally include CMA rounding logic at an output of a CMA multiplier.

In embodiment 24, the storage included in the subject matter of embodiment 18 can optionally include processor executable code to cause the processor to perform operations comprising: responsive to determining that the FP exception is one of the CMA intermediate rounding exceptions: obtaining a faulting CMA instruction ID; associating a CMA instruction counter with the CMA instruction ID; counting the CMA intermediate rounding exceptions associated with the CMA instruction ID; and responsive to determining that the CMA instruction counter has exceeded a predetermined threshold: retranslating with selective fusion code; and disabling the fusion code for a particular CMA instruction that caused the exception.

In embodiment 25, the CMA instruction counter included in the subject matter of embodiment 24 is optionally periodically reset.

In embodiment 26, the subject matter of embodiment 24 can optionally include reporting a CMA rounding error to a CMA intermediate rounding exception IP register.

In embodiment 27, the CMA intermediate rounding exception IP register included in the subject matter of embodiment 26 can optionally be exposed to software using a read special register instruction.

Embodiment 28 is a computer readable storage medium including processor-executable instructions to cause a processor to perform operations comprising: identifying a code region eligible for CMA optimization; translating code region instructions into interpreter code instructions, including translating sequences of multiply add instructions in the code region instructions into fusion code comprising CMA instructions; executing the interpreter code instructions, including executing the fusion code; monitoring FP exceptions generated by the fusion code; and retranslating a least a portion of the code region instructions to eliminate the fusion code from the portion of the code region responsive to receiving a number of CMA intermediate rounding exceptions exceeding a predetermined threshold.

In embodiment 29, the monitoring of FP exceptions generated by the fusion code included in the subject matter of embodiment 28 can optionally include: responsive to receiving the FP exception, determining if the FP exception is one of the CMA intermediate rounding exceptions; and responsive to determining that the FP exception is one of the CMA intermediate rounding exceptions: determining if a CMA intermediate rounding exception corresponding to the FP exception is a first fault; responsive to determining that the CMA intermediate rounding exception corresponding to the FP exception is a first fault, initializing a CMA region counter; and responsive to determining that the CMA intermediate rounding exception corresponding to the FP exception is not a first fault: incrementing the CMA region counter; and determining if the CMA region counter has exceeded a predetermined threshold.

In embodiment 30, the subject matter of embodiment 29 can optionally include operations for responsive to determining that the FP exception is not one of the CMA intermediate rounding exceptions, performing an FP exception treatment.

In embodiment 31, the subject matter of embodiment 29 can optionally include operations for: identifying multiple code regions eligible for CMA optimization; generating interpreter code corresponding to each of the code regions; assigning each of the code regions its own CMA region counter; and retranslating individual code regions without fusion code based on their corresponding CMA region counter.

In embodiment 32, the subject matter of embodiment 29 can optionally include operations for periodically resetting the CMA region counter.

In embodiment 33, the interpreter code instructions included in the subject matter of embodiment 28 can optionally include executing a floating point multiply add sequence in a fused multiply add pipeline.

In embodiment 34, the fused multiply add pipeline included in the subject matter of embodiment 33 can optionally include CMA rounding logic at an output of a CMA multiplier.

In embodiment 35, the operations included in the subject matter of embodiment 29 can optionally include operations for: responsive to determining that the FP exception is one of the CMA intermediate rounding exceptions: obtaining a faulting CMA instruction ID; associating a CMA instruction counter with the CMA instruction ID; counting the CMA intermediate rounding exceptions associated with the CMA instruction ID; responsive to determining that the CMA instruction counter has exceeded a predetermined threshold: retranslating with selective fusion code; and disabling the fusion code for a particular CMA instruction that caused the exception.

In embodiment 36, the CMA instruction counter included in the subject matter of embodiment 35 is optionally periodically reset.

In embodiment 37, the subject matter of embodiment 35 can optionally include reporting a CMA rounding error to a CMA intermediate rounding exception IP register.

In embodiment 38, the CMA intermediate rounding exception IP register included in the subject matter of embodiment 37 is optionally exposed to software using a read special register instruction.

In embodiment 39, the executing of the interpreter code instructions included in the subject matter of any one of embodiments 1-5 can optionally include executing a floating point multiply add sequence in a fused multiply add pipeline.

In embodiment 40, the CMA ALU included in the subject matter of any one of embodiments 12-13 can optionally include FMA rounding logic to report a second rounding exception generated by the adder.

In embodiment 41, the executing of the interpreter code instructions included in the subject matter of any one of embodiments 17-21 can optionally include executing a floating point multiply add sequence in a fused multiply add pipeline, and the fused multiply add pipeline can optionally include CMA rounding logic at an output of a CMA multiplier.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method, comprising:
   identifying, in a binary optimizer to execute on one or more hardware processor cores of a processor, a code region eligible for cumulative multiply add (CMA) optimization;
   translating code region instructions into interpreter code instructions, including translating sequences of multiply add instructions in the code region instructions into fusion code comprising CMA instructions;
   executing the interpreter code instructions, including executing the fusion code in a CMA arithmetic logic unit (ALU) of the processor;
   monitoring floating point (FP) exceptions generated by the fusion code; and
   retranslating at least a portion of the code region instructions to eliminate the fusion code from the portion of the code region responsive to receiving a number of CMA intermediate rounding exceptions exceeding a threshold.

2. The method of claim 1, wherein the monitoring of FP exceptions generated by the fusion code includes:
   responsive to receiving the FP exception, determining if the FP exception is one of the CMA intermediate rounding exceptions; and
   responsive to determining that the FP exception is one of the CMA intermediate rounding exceptions:
      determining if a CMA intermediate rounding exception corresponding to the FP exception is a first fault;
      responsive to determining that the CMA intermediate rounding exception corresponding to the FP exception is a first fault, initializing a CMA region counter; and
      responsive to determining that the CMA intermediate rounding exception corresponding to the FP exception is not a first fault:
         incrementing the CMA region counter; and
         determining if the CMA region counter has exceeded the threshold.

3. The method of claim 2, further comprising:
   responsive to determining that the FP exception is not one of the CMA intermediate rounding exceptions, performing an FP exception treatment.

4. The method of claim 2, further comprising:
   identifying multiple code regions eligible for CMA optimization;
   generating interpreter code corresponding to each of the code regions;
   assigning each of the code regions its own CMA region counter; and
   retranslating individual code regions without fusion code based on their corresponding CMA region counter.

5. The method of claim 2, further comprising:
   periodically resetting the CMA region counter.

6. The method of claim 1, wherein executing the interpreter code instructions includes executing a floating point multiply add sequence in a fused multiply add pipeline.

7. The method of claim 6, wherein the fused multiply add pipeline includes CMA rounding logic at an output of a CMA multiplier.

8. The method of claim 2, further comprising:
   responsive to determining that the FP exception is one of the CMA intermediate rounding exceptions:
      obtaining a faulting CMA instruction ID;
      associating a CMA instruction counter with the CMA instruction ID;
      counting the CMA intermediate rounding exceptions associated with the CMA instruction ID; and
      responsive to determining that the CMA instruction counter has exceeded the threshold:
         retranslating with selective fusion code; and
         disabling the fusion code for a particular CMA instruction that caused the exception.

9. The method of claim 8, wherein the CMA instruction counter is periodically reset.

10. The method of claim 8, wherein a CMA rounding error is reported to a CMA intermediate rounding exception IP register.

11. The method of claim 10, wherein the CMA intermediate rounding exception IP register is exposed to software using a read special register instruction.

12. A processor, comprising:
   a level one (L1) instruction cache;
   a front-end to fetch and decode instructions from the L1 instruction cache;
   an L1 data cache; and
   an execution pipeline to execute decoded instructions, wherein the execution pipeline includes a cumulative multiply add (CMA) arithmetic logic unit (ALU), including a multiplier and an adder and CMA rounding logic to report a first rounding exception generated by the multiplier.

13. The processor of claim 12, further comprising:
   a register to store an address of an instruction responsive to generation of a CMA rounding error exception.

14. The processor of claim 12, wherein the CMA ALU includes fused multiply add (FMA) rounding logic to report a second rounding exception generated by the adder.

15. The processor of claim 14, further comprising:
   logic to generate a floating point exception signal based on the first rounding exception.

16. The processor of claim 15, further comprising:
   logic to generate a floating point exception signal based on the second rounding exception.

17. A computer system, comprising:
   a processor comprising:
      a level one (L1) instruction cache;
      a front-end to fetch and decode instructions from the L1 instruction cache;
      an L1 data cache; and
      an execution pipeline to execute decoded instructions, wherein the execution pipeline includes a cumulative multiply add (CMA) arithmetic logic unit (ALU), including a multiplier and an adder and CMA rounding logic to report a first rounding exception generated by the multiplier; and
   storage accessible to the processor; wherein the storage includes processor executable code to cause the processor to perform operations comprising:
      identifying a code region eligible for CMA optimization;
      translating code region instructions into interpreter code instructions, including translating sequences of multiply add instructions in the code region instructions into fusion code comprising CMA instructions;
      executing the interpreter code instructions, including executing the fusion code;
      monitoring floating point (FP) exceptions generated by the fusion code; and
      retranslating at least a portion of the code region instructions to eliminate the fusion code from the portion of the code region responsive to receiving a number of CMA intermediate rounding exceptions exceeding a threshold.

18. The system of claim 17, wherein the monitoring of FP exceptions generated by the fusion code includes:
responsive to receiving the FP exception, determining if the FP exception is one of the CMA intermediate rounding exceptions; and
responsive to determining that the FP exception is one of the CMA intermediate rounding exceptions:
determining if a CMA intermediate rounding exception corresponding to the FP exception is a first fault;
responsive to determining that the CMA intermediate rounding exception corresponding to the FP exception is a first fault, initializing a CMA region counter; and
responsive to determining that the CMA intermediate rounding exception corresponding to the FP exception is not a first fault:
incrementing the CMA region counter; and
determining if the CMA region counter has exceeded the threshold.

19. The system of claim 18, wherein the storage further includes processor executable code to cause the processor to perform operations comprising:
responsive to determining that the FP exception is not one of the CMA intermediate rounding exceptions, performing an FP exception treatment.

20. The system of claim 18, wherein the storage further includes processor executable code to cause the processor to perform operations comprising:
identifying multiple code regions eligible for CMA optimization;
generating interpreter code corresponding to each of the code regions;
assigning each of the code regions its own CMA region counter; and
retranslating individual code regions without fusion code based on their corresponding CMA region counter.

21. The system of claim 18, wherein the storage further includes processor executable code to cause the processor to perform operations comprising:
periodically resetting the CMA region counter.

22. The system of claim 17, wherein executing the interpreter code instructions includes executing a floating point multiply add sequence in a fused multiply add pipeline.

23. The system of claim 22, wherein the fused multiply add pipeline includes CMA rounding logic at an output of the multiplier.

24. The system of claim 18, wherein the storage further includes processor executable code to cause the processor to perform operations comprising:
responsive to determining that the FP exception is one of the CMA intermediate rounding exceptions:
obtaining a faulting CMA instruction ID;
associating a CMA instruction counter with the CMA instruction ID;
counting the CMA intermediate rounding exceptions associated with the CMA instruction ID; and
responsive to determining that the CMA instruction counter has exceeded the threshold:
retranslating with selective fusion code; and
disabling the fusion code for a particular CMA instruction that caused the exception.

25. The system of claim 24, wherein the CMA instruction counter is to be periodically reset.

26. The system of claim 24, wherein a CMA rounding error is to be reported to a CMA intermediate rounding exception IP register.

27. The system of claim 26, wherein the CMA intermediate rounding exception IP register is to be exposed to software using a read special register instruction.

28. A non-transitory computer readable storage medium including processor-executable instructions to cause a processor to perform operations comprising:
identifying a code region eligible for cumulative multiply add (CMA) optimization;
translating code region instructions into interpreter code instructions, including translating sequences of multiply add instructions in the code region instructions into fusion code comprising CMA instructions;
executing the interpreter code instructions, including executing the fusion code;
monitoring floating point (FP) exceptions generated by the fusion code; and
retranslating at least a portion of the code region instructions to eliminate the fusion code from the portion of the code region responsive to receiving a number of CMA intermediate rounding exceptions exceeding a threshold.

29. The non-transitory computer readable storage medium of claim 28, wherein the monitoring of FP exceptions generated by the fusion code includes:
responsive to receiving the FP exception, determining if the FP exception is one of the CMA intermediate rounding exceptions; and
responsive to determining that the FP exception is one of the CMA intermediate rounding exceptions:
determining if a CMA intermediate rounding exception corresponding to the FP exception is a first fault;
responsive to determining that the CMA intermediate rounding exception corresponding to the FP exception is a first fault, initializing a CMA region counter; and
responsive to determining that the CMA intermediate rounding exception corresponding to the FP exception is not a first fault:
incrementing the CMA region counter; and
determining if the CMA region counter has exceeded the threshold.

30. The non-transitory computer readable storage medium of claim 29, wherein the operations include further operations for:
responsive to determining that the FP exception is not one of the CMA intermediate rounding exceptions, performing an FP exception treatment.

* * * * *